United States Patent [19]
Brown

[11] Patent Number: 5,919,007
[45] Date of Patent: Jul. 6, 1999

[54] COMBINED FILE AND RASP FOR LAMINATE MATERIALS

[75] Inventor: Billy Joe Brown, Hanceville, Ala.

[73] Assignee: Cooper Industries, Inc., Houston, Tex.

[21] Appl. No.: 09/014,827

[22] Filed: Jan. 28, 1998

[51] Int. Cl.⁶ .................................................. B23D 71/00
[52] U.S. Cl. ................................... 407/29.14; 407/29.13; 407/29.1; 29/76.1
[58] Field of Search .................. 407/29, 29.1, 29.12, 407/29.13, 29.14, 29.15; 29/76.1, 78, 79, 80

[56] References Cited

U.S. PATENT DOCUMENTS

| | | |
|---|---|---|
| 94,503 | 9/1869 | Nicholson . |
| 383,999 | 6/1888 | Stokes . |
| 416,805 | 12/1889 | Ridge . |
| 499,619 | 6/1893 | Weed . |
| 507,071 | 10/1893 | Huff et al. . |
| 672,780 | 4/1901 | Kellermann . |
| 995,761 | 6/1911 | Armstrong ............................ 407/29.13 |
| 1,042,728 | 10/1912 | Vernaz .................................. 407/29.1 |
| 1,076,262 | 10/1913 | Beche . |
| 2,027,039 | 1/1936 | Heller .................................... 407/29.13 |
| 2,460,513 | 2/1949 | Le Fevre . |
| 4,598,447 | 7/1986 | Whyde . |

FOREIGN PATENT DOCUMENTS

| | | |
|---|---|---|
| 254247 | 4/1926 | United Kingdom . |
| 456868 | 2/1936 | United Kingdom . |

*Primary Examiner*—Andrea L. Pitts
*Assistant Examiner*—Mark Williams
*Attorney, Agent, or Firm*—Burns, Doane, Swecker & Mathis LLP

[57] ABSTRACT

A combination rasp and file for laminate materials of the type including a top plastic layer includes a rasp side having a multiplicity of rasp teeth formed for removing plastic and wood effectively but without leaving an unacceptably rough finish. The rasp teeth are formed 15 teeth per row with 16 rows per inch at at least the belly of the tool. The rasp teeth have a face angle of 20°, a back angle of 35° and a gullet angle of 53°. A chisel cut file side has teeth formed for smoothing the work of the rasp and is formed with 34 teeth per inch oriented at 25 degrees to the transverse axis of the tool. The chisel cut teeth have a face angle of −6°, a back angle of 37° and a gullet angle of 61°.

15 Claims, 3 Drawing Sheets

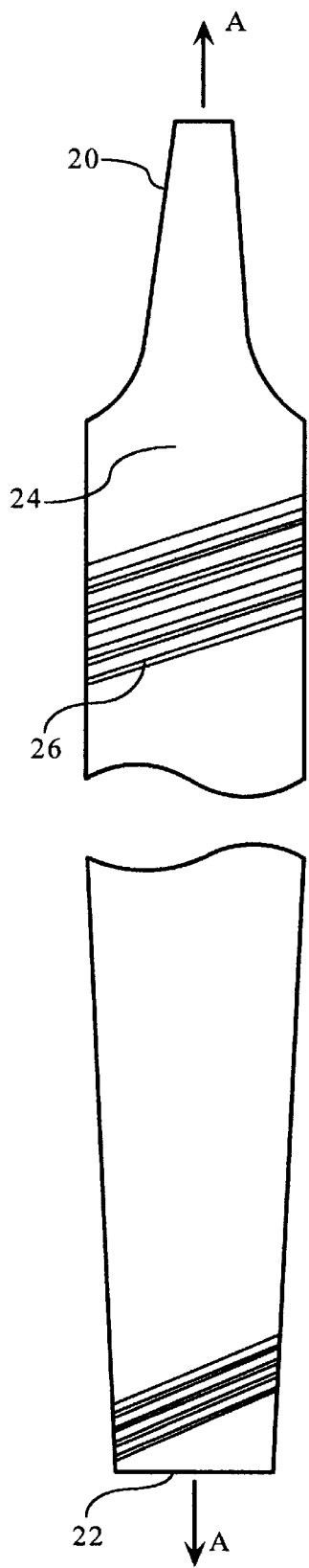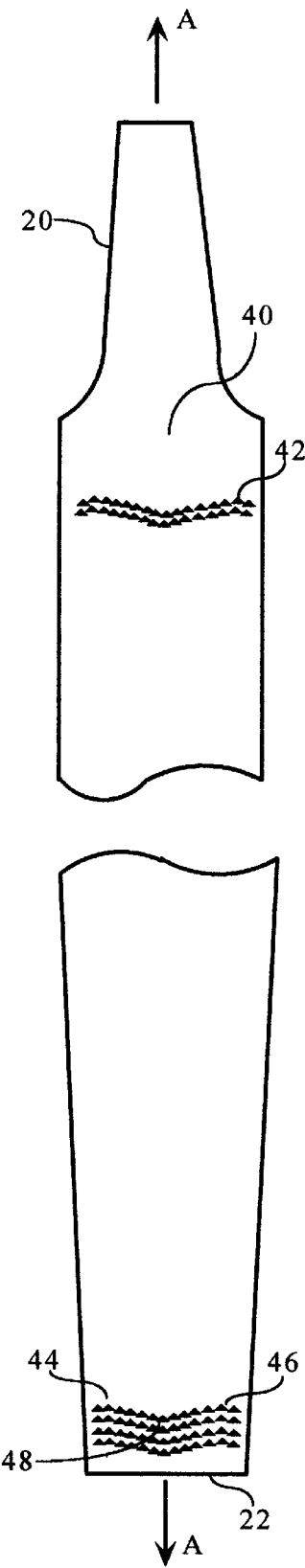
FIG. 1   FIG. 2

COMBINED FILE AND RASP FOR LAMINATE MATERIALS

BACKGROUND AND SUMMARY OF THE INVENTION

The invention is directed to cutting tools. More particularly, the present invention is directed to a combined rasp and file tool that is advantageous for laminate materials having a combination of wood and other material layers. One example is laminates having a top plastic layer, such as FORMICA brand laminates, typically used for counter tops and cabinets. Laminate materials formed of a combination of different materials are difficult to file because the different materials often have a different hardness. For example, the wood substrate layers are usually softer than the plastic top layer in a counter top laminate.

Laminate material files are usually designed for finishing work, and, as a result may encounter difficulty in removing material quickly. Wood rasps, which are designed for fast removal of wood, tend to remove too much material and leave too rough of a finish when used on laminates.

The present invention provides a single tool that is effective for both material removal of material and for finishing work.

The combination file and rasp is a tool having a rasp side for fast, effective removal of material and a file or chisel cut side for smoothing the material.

According to one aspect of the invention, the file or chisel cut side has 34 teeth per inch formed at a 25° angle to a transverse axis of the tool. The teeth are formed to have a face angle of −6°, a back angle of 37° and a gullet angle of 61°. The upper surface of the file side is first drawfiled to provide fine serrations for improved cutting action of the teeth. In addition, the teeth have a height rising from an upper surface of the tool of about 0.006 inches.

According to another aspect of the invention, the tool has a rasp side with a plurality of rasp teeth formed in rows of 15 teeth, with 16 rows of teeth per inch measured along the longitudinal axis.

According to yet another aspect of the invention, the rows are wave shaped, having two curves that meet at the center longitudinal axis of the tool. Preferably, the curves have a radius of curvature of about ⅝ of the inch, that is, about 0.63 inches.

In addition, the teeth in adjacent rows are in relatively staggered relationship.

The rasp teeth are formed with a face angle of 20°, a back angle of 35° and a gullet angle of 53°.

In addition, the rasp tooth has a narrow radius top and a height measured from an upper surface of about 0.035 inches.

BRIEF DESCRIPTION OF THE DRAWINGS

The invention will be better understood by reference to the following detailed description in conjunction with the appended drawings, in which:

FIG. 1 is a plan view of a chisel-cut or file side of a tool in accordance with the invention;

FIG. 2 is a plan view of a rasp side of the tool;

DETAILED DESCRIPTION

Figure 3:
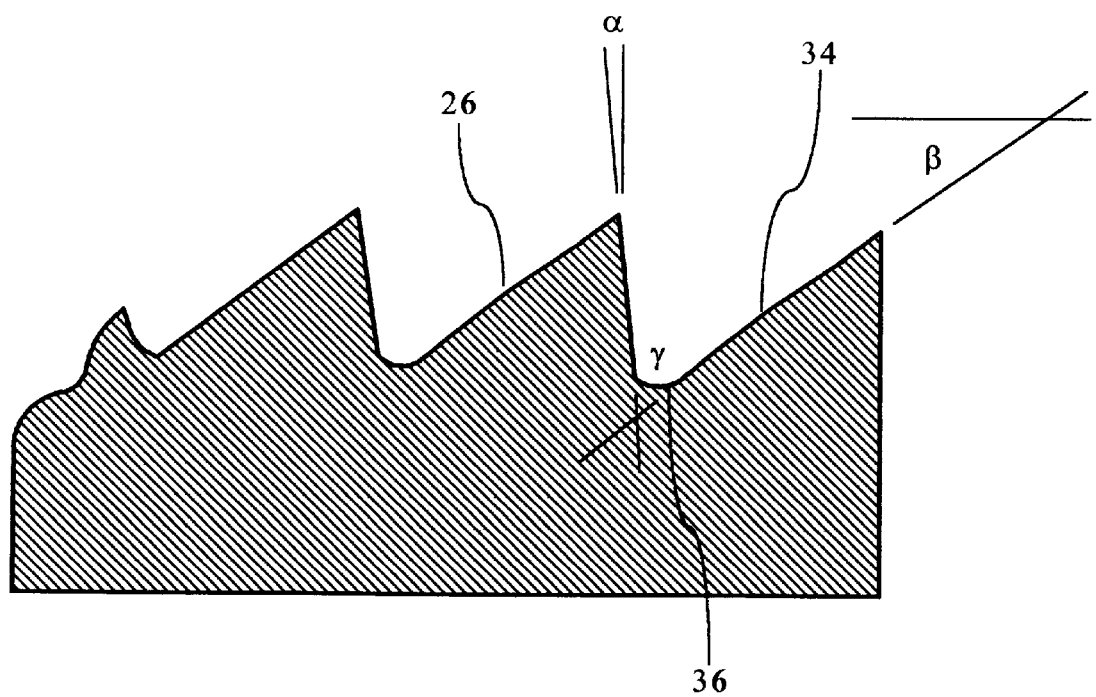
FIG. 3 is a profile of a file tooth.

A file and rasp tool for laminate materials is shown in FIGS. 1 and 2. FIG. 1 illustrates a chisel-cut side of the tool for smoothing and finishing a workpiece. FIG. 2 shows a rasp side of the tool for rapid material removal.

The tool is formed from flat bar stock to have a tang 20 and a tapered point 22. For reference purposes, a longitudinal axis A extends from the tang 20 to the point 22.

The chisel-cut side 24, also called the file side, has a plurality of teeth 26 oriented obliquely to the longitudinal axis A. The teeth 26 are preferably at an angle of about 65° to the longitudinal axis or about 25° to a line perpendicular to the longitudinal axis. According to the invention, there are 34 teeth per inch measured along the longitudinal axis A.

Referring now to FIG. 3, a profile view of a chisel-cut tooth 26 is shown. Each tooth 26 has a face 32, that is, a surface that faces the point 22. A back 34 of the tooth 26 is opposite the face, and a gullet 36 forms the intersection between the face of one tooth and the back of the preceding tooth. The tooth geometry is designed for smoothing of laminate material. According to the invention, the chisel-cut tooth 26 has a face angle α of −6°, which provides a good cutting action for smoothing a workpiece. The tooth 26 has a back angle β of 37°. The back angle is measured relative to a horizontal line parallel to the top surface of the chisel cut side. The tooth 26 and a gullet angle γ of 61°. The file tooth 26 has a height from the upper surface of the tool of about 0.006 inches. The teeth are cut so that the gullet is also about 0.006 inches deep below the upper surface, so that a total distance from the gullet to the top of the tooth is about 0.012 inches.

In addition, the chisel-cut side 24 surface is prepared before the teeth are formed by drawfiling the blank along the longitudinal axis A. Drawfiling the surface 24 provides a fine serrated surface. When the teeth are formed on the serrated surface, the upper surface of the teeth includes fine, sharp cutting edges, which improves the cutting action of the teeth.

Turning to FIG. 2, the rasp side 40 of the tool includes a plurality of rasp teeth formed in a plurality of rows 42. According to the invention, the rasp teeth are formed 15 teeth per row in at least the belly or center portion of the tool. Because of the taper of the tool at the point, there may be fewer teeth in the rows near the point. There are also 16 rows per inch measured along the longitudinal axis A.

As seen in FIG. 2, the rows 42 of rasp teeth have a wave curvature of two curves 44, 46 concave in the direction of the tool point 22. The curves 44, 46 meet at a forward point 48 coinciding at approximately the longitudinal axis A. The curves 44, 46 are formed with a radius of curvature of about 0.63 inches.

Also, as can be seen, the relative position of teeth in adjacent rows is staggered, that is, the teeth are not positioned linearly in the longitudinal direction, but alternate by one half a pitch distance.

Figure 4:
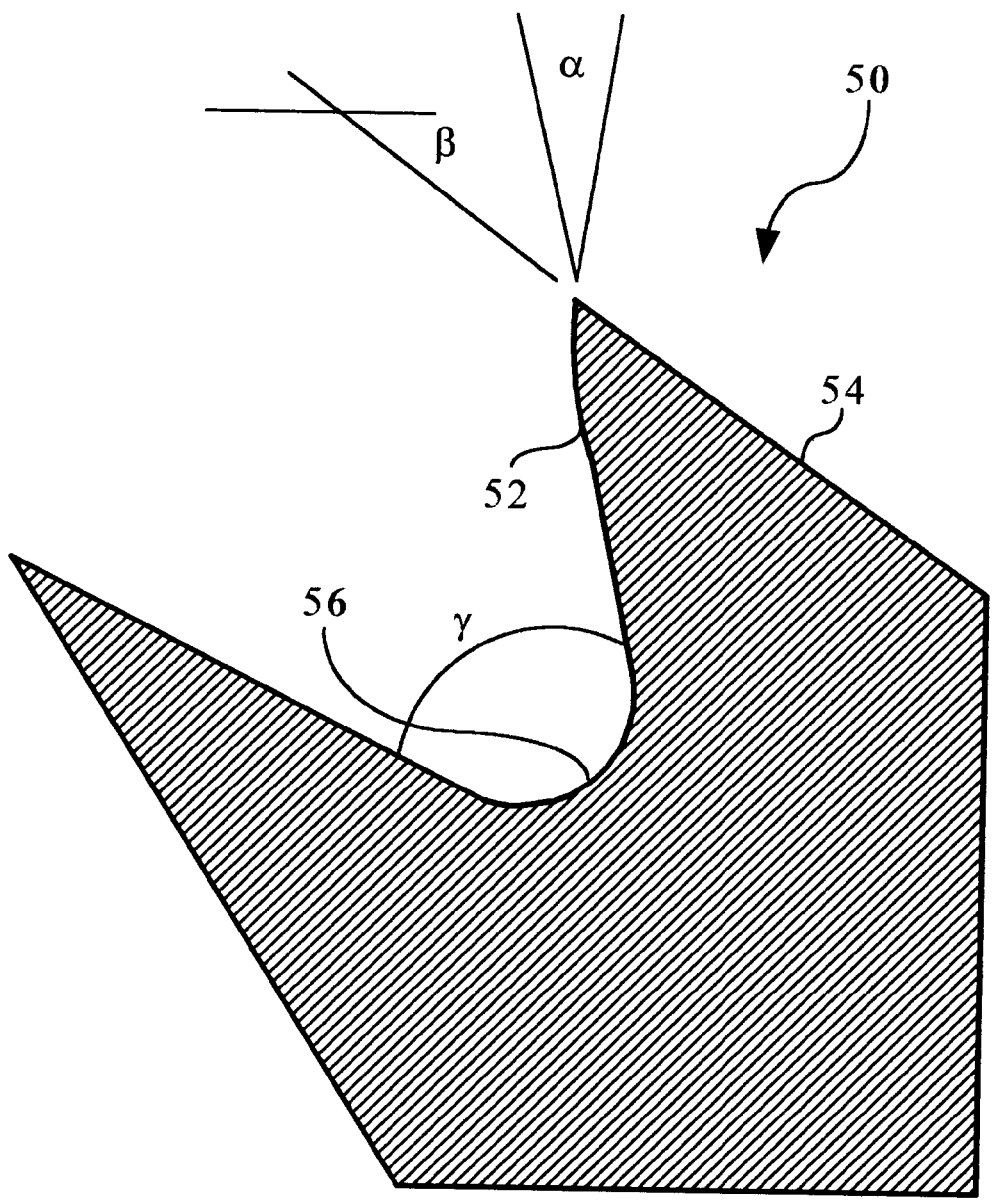
FIG. 4 is a profile of a rasp tooth.

Referring now to FIG. 4, the rasp tooth 50 has a face angle α of 20°. The face 52 is angled toward the point 22 of the tool, and is slightly convex. The rasp tooth 50 also has a back angle β of 35° and a gullet angle γ of 53°.

The rasp tooth 50 also has a narrow radius top, that is, the tooth narrows in the direction away from the tool. A height of the tooth from an upper surface of the rasp side is about 0.035 inches. The gullet is formed to have a depth approximately the same as the tooth height, that is, about 0.035. A total distance from the gullet to the tooth top is thus approximately 0.07 inches.

The relatively high tooth, narrow radius top, and the wave pattern arrangement of the teeth provides for quick cutting entry into the material being worked. The close positioning of the teeth in a relatively staggered relationship provides a rasp surface that achieves comprehensive contact of the workpiece, that is, a high degree of contact between the surface of the rasp side and the workpiece. The combined effect of the rasp tooth geometry and placement allows for effective removal of material without leaving a finish unacceptably rough beyond what can be smoothed by the file side.

The invention has been described in terms of preferred embodiments, principles and structure. Those of skill in the art will recognize that substitutions can be made without departing from the scope of the invention as defined in the claims.

What I claim is:

1. A combined file and rasp tool for laminate materials, comprising:

a rasp side having a plurality of teeth arranged in a plurality of rows, each row in at least a belly portion of the tool having 15 teeth, there being 16 rows of teeth per inch in at least the belly of the rasp side, the rows being shaped as a wave with two curves concave toward a point of the tool, the teeth in adjacent rows being in a relatively staggered relationship; and a chisel cut side having a plurality of teeth arranged in a plurality of rows, there being 34 teeth per inch measured along a longitudinal axis of the tool, wherein the teeth are oriented at an angle of 25 degrees to a transverse axis of the tool.

2. The combined file and rasp tool as claimed in claim 1, wherein the two curves of the wave shape have a radius of curvature of about 0.63 inches.

3. The combined file and rasp tool as claimed in claim 1, wherein the rasp side teeth each have a face angle of 20 degrees.

4. The combined file and rasp tool as claimed in claim 1, wherein the rasp side teeth each have a back angle of 35 degrees and a gullet angle of 53 degrees.

5. The combined file and rasp tool as claimed in claim 1, wherein each rasp side tooth has a top that is narrower than a base.

6. The combined file and rasp tool as claimed in claim 1, wherein each rasp side tooth has a height of 0.035 measured from an upper surface of the tool.

7. The combined file and rasp tool as claimed in claim 1, wherein each chisel cut side tooth has a face angle of −6 degrees.

8. The combined file and rasp tool as claimed in claim 1, wherein each chisel cut tooth has a back angle of 37 degrees and a gullet angle of [61] degrees.

9. The combined file and rasp tool as claimed in claim 1, wherein the chisel cut side is drawfiled.

10. A combined file and rasp tool for laminate materials, comprising:

a rasp side having a plurality of teeth arranged in a plurality of rows, the rasp side teeth each having a face angle of 20 degrees, a back angle of 35 degrees and a gullet angle of 53 degrees; and a chisel cut side having a plurality of teeth arranged in a plurality of rows, each chisel cut side tooth having a face angle of −6 degrees, a back angle of 37 degrees and a gullet angle of 61 degrees.

11. The combined file and rasp tool as claimed in claim 10, wherein on the rasp side each row in at least a belly portion of the tool has 15 teeth, there being 16 rows of teeth per inch in at least the belly of the rasp side.

12. The combined file and rasp tool as claimed in claim 10, wherein on the rasp side the rows are shaped as a wave with two curves concave toward a point of the tool, the teeth in adjacent rows being in a staggered relationship.

13. The combined file and rasp tool as claimed in claim 10, wherein the two curves of the wave shape have a radius of curvature of about 0.63 inches.

14. The combined file and rasp tool as claimed in claim 10, wherein on the chisel cut side there are 34 teeth per inch measured on a longitudinal axis of the tool.

15. The combined file and rasp tool as claimed in claim 10, wherein on the chisel cut side the teeth are oriented at an angle of 25 degrees to a transverse axis of the tool.

* * * * *